(12) United States Patent
Kato et al.

(10) Patent No.: US 12,441,140 B2
(45) Date of Patent: Oct. 14, 2025

(54) SOLID TIRE AND METHOD FOR MANUFACTURING SAME

(71) Applicants: The Yokohama Rubber Co., LTD., Kanagawa (JP); AICHI TIRE INDUSTRY CO., LTD., Aichi (JP)

(72) Inventors: Hisaki Kato, Aichi (JP); Yoichi Miwa, Aichi (JP); Satoru Asano, Aichi (JP); Hiroaki Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/721,817

(22) PCT Filed: Nov. 14, 2022

(86) PCT No.: PCT/JP2022/042193
§ 371 (c)(1),
(2) Date: Jun. 19, 2024

(87) PCT Pub. No.: WO2023/119941
PCT Pub. Date: Jun. 29, 2023

(65) Prior Publication Data
US 2024/0416686 A1 Dec. 19, 2024

(30) Foreign Application Priority Data
Dec. 24, 2021 (JP) .................................. 2021-210774

(51) Int. Cl.
*B60C 19/00* (2006.01)
*B29D 30/02* (2006.01)
(Continued)

(52) U.S. Cl.
CPC .............. *B60C 19/00* (2013.01); *B29D 30/02* (2013.01); *B60C 7/00* (2013.01); *B60C 7/102* (2013.01)

(58) Field of Classification Search
CPC ........... B60C 7/102; B60C 7/00; B60C 19/00; B29D 30/02; B60B 9/00
See application file for complete search history.

(56) References Cited

U.S. PATENT DOCUMENTS 955,188 A * 4/1910 Nelson .................... B60C 7/102
152/209.1
3,762,458 A * 10/1973 Yoshida ................ B60C 9/1821
152/527
(Continued)

FOREIGN PATENT DOCUMENTS

CN 110978584 A 4/2020
DE 102016221266 A1 5/2018
(Continued)

OTHER PUBLICATIONS

Machine translation of JP59142129 (Year: 1984).*
Use of Short Fibers as Filler in Rubber Compounds. Meissner et al. Autex Research Journal, vol. 13, No. 2, Jun. 2013. 4 pages.*

*Primary Examiner* — Jason R Bellinger
(74) *Attorney, Agent, or Firm* — Thorpe North & Western

(57) ABSTRACT

In a solid tire including a tread rubber layer on a road contact surface side and a base rubber layer on a rim side, the base rubber layer has JIS-A hardness of 80 or higher, and an RFID tag is embedded in the base rubber layer. When forming an unvulcanized tire by winding a rubber sheet into multiple layers, the RFID tag is inserted between layers of the rubber sheet in the middle of the winding into multiple layers, or the RFID tag and a coating layer are overlaid and attached on a side surface of the unvulcanized tire, and then the unvulcanized tire including the RFID tag is vulcanized in a mold.

13 Claims, 11 Drawing Sheets

(51) Int. Cl.
B60C 7/00 (2006.01)
B60C 7/10 (2006.01)

(56) References Cited

U.S. PATENT DOCUMENTS

| | | | | |
|---|---|---|---|---|
| 4,294,951 | A * | 10/1981 | Sugita | C08G 18/4854 |
| | | | | 528/906 |
| 4,914,248 | A * | 4/1990 | Kitagawa | C08G 81/022 |
| | | | | 525/92 H |
| 5,118,773 | A * | 6/1992 | Takao | C08K 3/06 |
| | | | | 526/143 |
| 6,142,203 | A * | 11/2000 | Bickford | B60C 11/02 |
| | | | | 152/394 |
| 11,021,021 | B1 * | 6/2021 | Nicula | B60C 19/00 |
| 11,052,622 | B2 * | 7/2021 | Hosomi | B29D 30/0061 |
| 11,820,090 | B2 * | 11/2023 | Caccami | B29D 30/0016 |
| 11,858,300 | B2 * | 1/2024 | Messina | B60C 7/143 |
| 11,932,059 | B2 * | 3/2024 | Pedrinelli | B60C 15/06 |
| 2002/0129883 | A1 * | 9/2002 | O'Coin | B60C 7/102 |
| | | | | 152/267 |
| 2005/0247391 | A1 * | 11/2005 | Ikuta | B60C 17/0009 |
| | | | | 152/565 |
| 2011/0284155 | A1 * | 11/2011 | Sevaille | B29C 70/685 |
| | | | | 156/543 |
| 2015/0034222 | A1 * | 2/2015 | Martin | B60C 7/00 |
| | | | | 73/146 |
| 2018/0174015 | A1 * | 6/2018 | Destraves | B60C 23/0452 |
| 2020/0164605 | A1 * | 5/2020 | Yoshida | H01Q 1/2225 |
| 2020/0180366 | A1 * | 6/2020 | Nakajima | B60C 19/00 |
| 2022/0194035 | A1 * | 6/2022 | Mosko | B29D 30/48 |
| 2023/0001749 | A1 * | 1/2023 | De Witte | B60C 11/243 |
| 2024/0253403 | A1 * | 8/2024 | Rollins | G06K 19/07764 |
| 2024/0253404 | A1 * | 8/2024 | Fukuda | B60C 15/04 |

FOREIGN PATENT DOCUMENTS

| | | | |
|---|---|---|---|
| DE | 102016221267 A1 | 5/2018 | |
| JP | 58093603 A * | 6/1983 | B60C 7/102 |
| JP | 59142129 A * | 8/1984 | B29D 30/02 |
| JP | H08-282206 A | 10/1996 | |
| JP | H10-53005 A | 2/1998 | |
| JP | H10-147107 A | 6/1998 | |
| JP | 2000-211316 A | 8/2000 | |
| JP | 2010-163123 A | 7/2010 | |
| JP | 2016-117296 A | 6/2016 | |
| JP | 2018-503085 A | 2/2018 | |
| JP | 2021-2254 A | 1/2021 | |
| JP | 2021-79914 A | 5/2021 | |
| WO | WO 2018077501 A1 | 5/2018 | |
| WO | 2019/054226 A1 | 3/2019 | |

* cited by examiner

SOLID TIRE AND METHOD FOR MANUFACTURING SAME

RELATED APPLICATIONS

This application is the National Stage of International Patent Application No. PCT/JP2022/042193, filed on Nov. 14, 2022, which claims the benefit of priority from Japan Patent Application No. 2021-210774, filed on Dec. 24, 2021.

TECHNICAL FIELD

The present technology relates to a solid tire represented by a pneumatic cushion tire for an industrial vehicle and a method for manufacturing the same, and more particularly, to a solid tire including a radio frequency identification (RFID) tag for product identification and capable of sufficiently ensuring a protection effect of the RFID tag and a method for manufacturing the same.

BACKGROUND ART

A pneumatic cushion tire for an industrial vehicle is a solid tire for a forklift having an appearance in terms of shape similar to that of a pneumatic tire. This type of solid tire is used under conditions of low speed and high load, and in some cases, is used under severe conditions such as when a steering wheel is operated while the vehicle is stopped.

A solid tire generally includes a tread rubber layer on a road contact surface side and a base rubber layer on a rim side. The base rubber layer is formed of a hard rubber composition, and the tread rubber layer is formed of a rubber composition for which grip properties, wear resistance, chipping resistance, heat build-up resistance, and rolling resistance are emphasized (for example, refer to Japan Unexamined Patent Publication Nos. H10-147107 A, 2010-163123 A and 2016-117296 A).

In recent years, it is necessary to perform quality control and history management for each product of the solid tire as described above. However, at present, no specific means for efficiently performing quality control and history management for each product of a solid tire has been proposed.

SUMMARY

The present technology provides a solid tire including an RFID tag for product identification and capable of sufficiently ensuring a protection effect of the RFID tag, and a method for manufacturing the same.

A solid tire of the present technology includes a tread rubber layer on a road contact surface side and a base rubber layer on a rim side. The base rubber layer has JIS (Japanese Industrial Standard)-A hardness of 80 or higher, and a radio frequency identification (RFID) tag is embedded in the base rubber layer.

In addition, a method (first method) for manufacturing a solid tire of the present technology is a method for manufacturing the above-described solid tire and includes: when forming an unvulcanized tire by winding a rubber sheet into multiple layers, inserting an RFID tag between layers of the rubber sheet in the middle of the winding into multiple layers; and vulcanizing the unvulcanized tire including the RFID tag in a mold.

Furthermore, a method (second method) for manufacturing a solid tire of the present technology is a method for manufacturing the above-described solid tire, and includes: forming an unvulcanized tire by winding a rubber sheet into multiple layers; then attaching an RFID tag to a side surface of the unvulcanized tire; further overlaying and attaching a coating layer made of unvulcanized rubber having a thickness of 0.5 mm to 10 mm on the RFID tag; and then vulcanizing the unvulcanized tire including the RFID tag in a mold.

According to the present technology, in the solid tire including the tread rubber layer on the road contact surface side and the base rubber layer on the rim side, the RFID tag for product identification is embedded in the base rubber layer, so quality control and history management for each product can be performed using the RFID tag. Furthermore, since the JIS-A hardness of the base rubber layer in which the RFID tag is embedded is 80 or higher, the protection effect of the RFID tag can be sufficiently ensured, and quality control and history management for each product can be performed over a long period of time. Note that the JIS-A hardness in the present technology is the durometer hardness measured in accordance with JIS-K6253 using a type A durometer and under a temperature of 23° C.

In the present technology, the RFID tag is preferably disposed near a side surface of the base rubber layer, and more specifically, a distance between the RFID tag and the side surface of the base rubber layer is preferably within a range of 0.5 mm to 10.0 mm. As a result, good response accuracy can be exhibited while the protection effect of the RFID tag is sufficiently ensured.

When the RFID tag is disposed near the side surface of the base rubber layer, the RFID tag is preferably disposed at a position deviating from a rim slippage region defined within a range of −15% to +15% of a rim flange height with an apex of a rim flange as a center. As a result, even when rim slippage occurs in the solid tire, the protection effect of the RFID tag can be sufficiently ensured. The rim flange height is a height in a radial direction of a rim from a rim diameter position on a specified rim to a rim flange apex. The "specified rim" refers to a rim defined, in a standard system that includes standards on which tires are based, by the standards for each tire, and refers, for example, to an applicable rim for The Japan Automobile Tyre Manufacturers Association, Inc. (JATMA). The dimensions of the applicable rim of JATMA are defined by JIS-D6402 "Wheels for industrial vehicles and off the road service-Contours of rims".

The RFID tag is preferably embedded substantially parallel to the side surface of the base rubber layer. This can enhance the response accuracy of the RFID tag.

The RFID tag is preferably disposed near the side surface of the base rubber layer that is on an outer side of a vehicle when mounted on the vehicle. This enhances convenience of a communication work with the RFID tag.

Short fibers are preferably blended in a rubber composition constituting the base rubber layer. As a result, deformation of the base rubber layer can be suppressed, and the protection effect of the RFID tag can be enhanced. In addition, the short fibers are blended into the rubber composition constituting the base rubber layer, so that the rim slippage is suppressed, and from this standpoint as well, the protection effect of the RFID tag can be enhanced. The short fibers preferably contain 1 phr to 10 phr of vinylon fibers having a fiber length of 2 mm to 10 mm and a fiber diameter of 5 μm to 50 μm (weight with respect to 100 parts by weight of rubber).

The RFID tag is preferably coated with an adhesive. As a result, the adhesion between the RFID tag and the rubber can be enhanced, and a tire failure caused by peeling between the RFID tag and the rubber can be prevented.

The RFID tag is preferably coated with polyphenylene sulfide resin. The durability of the RFID tag can be improved by coating the RFID tag with the polyphenylene sulfide resin having heat resistance.

The RFID tag is preferably coated with ceramic. The durability of the RFID tag can be improved by coating the RFID tag with ceramic having heat resistance and rigidity.

The RFID tag is preferably coated with a plurality of reinforcing fiber cords. Alternatively, the RFID tag is preferably coated with a reinforcing fabric. By coating the RFID tag with the reinforcing fiber cord or reinforcing fabric, the durability of the RFID tag can be improved.

According to the method (first method) for manufacturing a solid tire of the present technology, when forming an unvulcanized tire by winding a rubber sheet into multiple layers, an RFID tag is inserted between layers of the rubber sheet in the middle of the winding into multiple layers, whereby the RFID tag can be embedded at a desired position of the solid tire. In particular, when winding the rubber sheet into multiple layers, a winding position of the rubber sheet in the radial direction of the unvulcanized tire is calculated in accordance with a winding length and a thickness of the rubber sheet, and the RFID tag is inserted in accordance with the winding position, whereby the RFID tag can be embedded with high accuracy.

In addition, according to the method (second method) for manufacturing a solid tire of the present technology, an unvulcanized tire is formed by winding a rubber sheet into multiple layers, an RFID tag is attached to a side surface of the unvulcanized tire, and a coating layer made of unvulcanized rubber having a thickness of 0.5 mm to 10 mm is overlaid and attached on the RFID tag, whereby the RFID tag can be embedded at a desired position of the solid tire.

DETAILED DESCRIPTION

Figure 1:
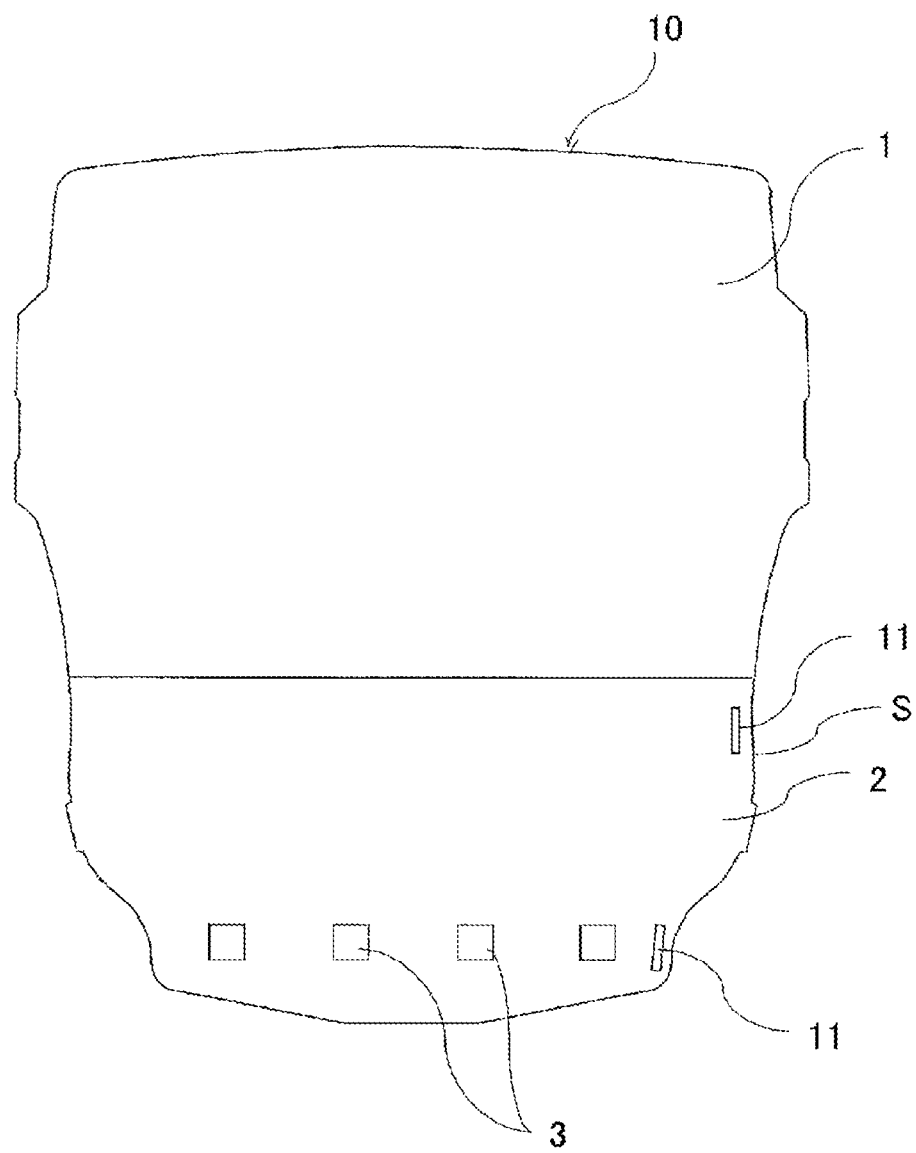
FIG. 1 is a meridian cross-sectional view illustrating a solid tire according to an embodiment of the present technology.

Configurations of embodiments of the present technology will be described in detail below with reference to the accompanying drawings. FIG. 1 illustrates a solid tire (a pneumatic cushion tire for an industrial vehicle) according to an embodiment of the present technology.

As illustrated in FIG. 1, a solid tire 10 of the present embodiment has a toroidal shape and includes a tread rubber layer 1 positioned on a road contact surface side (outer side in the tire radial direction) and a base rubber layer 2 positioned on a rim side (inner side in the tire radial direction).

The tread rubber layer 1 is formed of a rubber composition mainly composed of a diene rubber such as natural rubber, styrene-butadiene rubber, or butadiene rubber. Carbon black or silica can be added as a reinforcing agent to the rubber composition constituting the tread rubber layer 1, and in the case of silica, an organic silane coupling agent or the like can be added together. Examples of the organic silane coupling agent may include bis(triethoxy-silylpropyl)tetrasulfide (TESPT). Further, the rubber composition constituting the tread rubber layer 1 may contain other blending agents that are generally used.

The JIS-A hardness of the tread rubber layer 1 is not particularly limited but preferably ranges from 50 to 75, for example. If the JIS-A hardness of the tread rubber layer 1 is less than 50, an amount of distortion in the tire radial direction becomes too large and the horizontal rigidity becomes too small due to a reduction in rigidity. On the other hand, if the JIS-A hardness of the tread rubber layer 1 exceeds 75, the amount of distortion in the tire radial direction is reduced due to an increase in rigidity, and the vibration-absorbing property is lowered, thereby deteriorating the ride comfort.

The base rubber layer 2 is formed of a rubber composition mainly composed of a diene rubber such as natural rubber, styrene-butadiene rubber, or butadiene rubber. Carbon black and further a phenol resin can be added as a reinforcing agent to the rubber composition constituting the base rubber layer 2, and hexamethylenetetramine or the like can be added together as a curing agent for the phenol resin. Further, the rubber composition constituting the base rubber layer 2 may contain other blending agents that are generally used.

JIS-A hardness of the base rubber layer 2 is 80 or higher. If the JIS-A hardness of the base rubber layer 2 is less than 80, the amount of distortion in the tire radial direction becomes too large and the horizontal rigidity becomes too small due to a reduction in rigidity. When the rigidity of the base rubber layer 2 is insufficient, rim slippage due to contact between the base rubber layer 2 and the rim flange is likely to occur during driving.

Two or more bead cores 3 continuing annularly along a tire circumferential direction are disposed inside the base rubber layer 2. The bead cores 3 are disposed symmetrically with respect to a tire equatorial plane. As the bead core 3, a bead core formed by winding a plurality of bead wires multiple times (so-called strand bead wire), a bead core formed by winding a single bead wire multiple times, a bead core formed of a single steel ring, or the like can be used. In order to ensure adhesion to the base rubber layer 2, when a bead wire is used, the surface thereof is generally subjected to zinc plating or brass plating of tin and copper, and when a steel ring is used, the surface thereof is generally coated with various vulcanizing adhesives. In addition, instead of providing the bead core 3, short fibers may be blended into the rubber composition constituting the base rubber layer 2. If necessary, short fibers may be blended into the rubber composition constituting the base rubber layer 2 simultaneously with the provision of the bead cores 3. As such short fibers, short fibers made of organic fibers such as nylon, polyester, rayon, aramid and vinylon can be used.

In the above-described solid tire 10, an RFID tag 11 is embedded in the base rubber layer 2. In FIG. 1, the RFID tags 11 are embedded in a plurality of locations of the base rubber layer 2, but the RFID tag 11 may be embedded in at least one location of the base rubber layer 2. A structure of the RFID tag 11 is not particularly limited, but a passive type is mainly used. The RFID tag 11 includes an IC substrate in which data is stored and an antenna for transmitting and receiving data in a contactless manner, and has, for example, a rectangular shape or a rectangular sheet shape in which a length of one side is 7 mm to 50 mm. An appropriate RFID tag 11 is selected in accordance with a tire size and required sensitivity. In addition, since the RFID tag 11 is exposed to high temperatures during vulcanization, a heat-resistant type is preferable.

As described above, in the solid tire 10 including the tread rubber layer 1 on the road contact surface side and the base rubber layer 2 on the rim side, the RFID tag 11 for product identification is embedded in the base rubber layer 2, so quality control and history management for each product can be performed using the RFID tag 11. That is, it is possible to perform quality control by associating an identification number stored in the RFID tag 11 with a manufacturing condition, and to ensure traceability after shipment by using the identification number stored in the RFID tag 11. In addition, since the JIS-A hardness of the base rubber layer 2 in which the RFID tag 11 is embedded is 80 or higher, the protection effect of the RFID tag 11 can be sufficiently ensured, and quality control and history management for each product can be performed over a long period of time.

Figure 2:
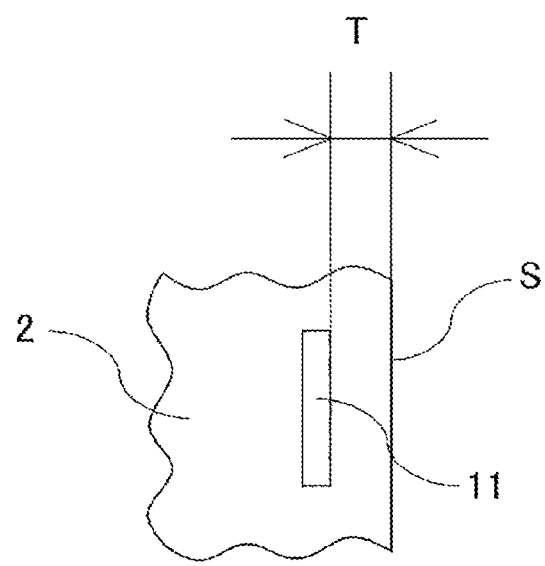
FIG. 2 is an enlarged cross-sectional view illustrating a part of a base rubber layer in which an RFID tag is embedded.

In the solid tire 10, the RFID tag 11 is preferably disposed near the side surface S of the base rubber layer 2. More specifically, as illustrated in FIG. 2, a distance T between the RFID tag 11 (particularly, an antenna portion) and the side surface S of the base rubber layer 2 preferably ranges from 0.5 mm to 10.0 mm. As a result, the data of the RFID tag 11 can be normally read while the protection effect of the RFID tag 11 is sufficiently ensured, and good response accuracy can be exhibited. Here, if the distance T between the RFID tag 11 and the side surface S of the base rubber layer 2 is less than 0.5 mm, the RFID tag 11 may be exposed when the side surface S of the base rubber layer 2 is damaged or worn during driving of the tire. On the other hand, if the distance T exceeds 10.0 mm, the reading accuracy of the RFID tag 11 tends to decrease. In particular, the distance T between the RFID tag 11 and the side surface S of the base rubber layer 2 preferably ranges from 0.5 mm to 6.0 mm.

Figure 3:
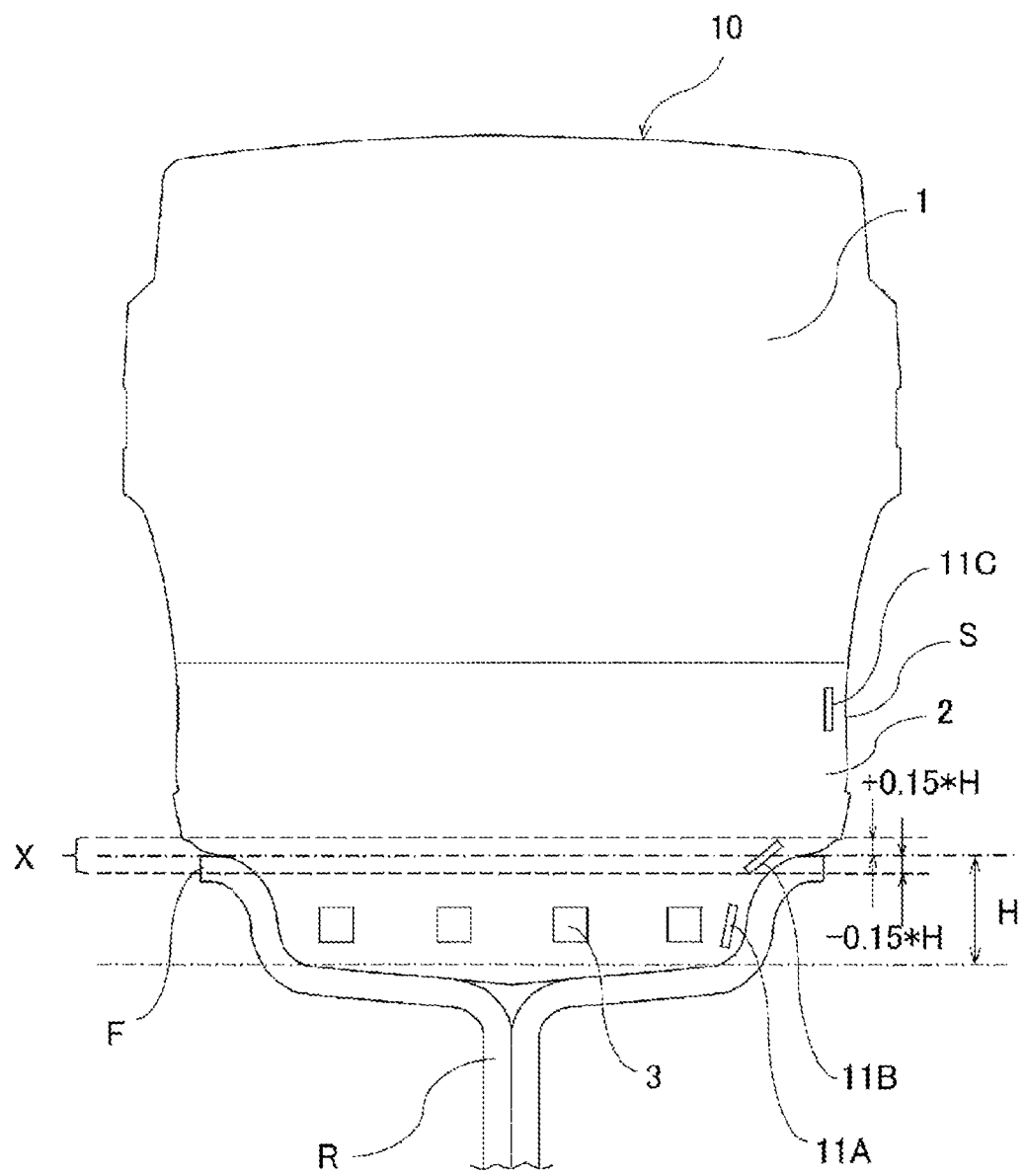
FIG. 3 is a meridian cross-sectional view illustrating a rim slippage region in a solid tire.

FIG. 3 illustrates a rim slippage region in a solid tire. When the RFID tag 11 is disposed near the side surface S of the base rubber layer 2, the RFID tag 11 is preferably disposed at a position deviating from a rim slippage region X. That is, as illustrated in FIG. 3, the solid tire 10 is mounted to a rim R at the time of use, but under severe use conditions such as sudden acceleration, sudden braking, and sharp turning, wear or damage due to rim slippage is likely to occur near an apex of a rim flange F. Therefore, by disposing the RFID tag 11 at a position deviating from the rim slippage region X defined within a range of −15% to +15% of a rim flange height H with the apex of the rim flange F as a center, the protection effect of the RFID tag 11 can be sufficiently ensured even when the rim slippage occurs in the solid tire 10. For example, in FIG. 3, an RFID tag 11A disposed further on an inner side than the rim slippage region X in the radial direction and an RFID tag 11C disposed further on an outer side than the rim slippage region X in the radial direction are less likely to be damaged than an RFID tag 11B disposed in the rim slippage region X.

In the solid tire 10, the RFID tag 11 is preferably embedded substantially parallel to the side surface S of the base rubber layer 2. As a result, the response accuracy of the RFID tag 11 can be improved. Note that the state in which the RFID tag 11 is substantially parallel to the side surface S of the base rubber layer 2 is a state in which an angle between the sheet-shaped RFID tag 11 and the side surface S of the base rubber layer 2 is within ±20°. If the angle deviates from the range of ±20°, the reception sensitivity tends to decrease.

In the solid tire 10, the RFID tag 11 is preferably disposed near one of both side surfaces of the base rubber layer 2, which is on the outer side of the vehicle when mounted on the vehicle. In this case, since the RFID tag 11 is disposed on the outer side of the vehicle in a state in which the solid tire 10 is mounted on the vehicle, convenience of a communication work with the RFID tag 11 is enhanced. In the solid tire 10 on which a mounting direction with respect to the vehicle is designated (displayed), the RFID tag 11 is disposed near the side surface of the base rubber layer 2 that is on the outer side of the vehicle in the designated mounting state.

Figure 4:
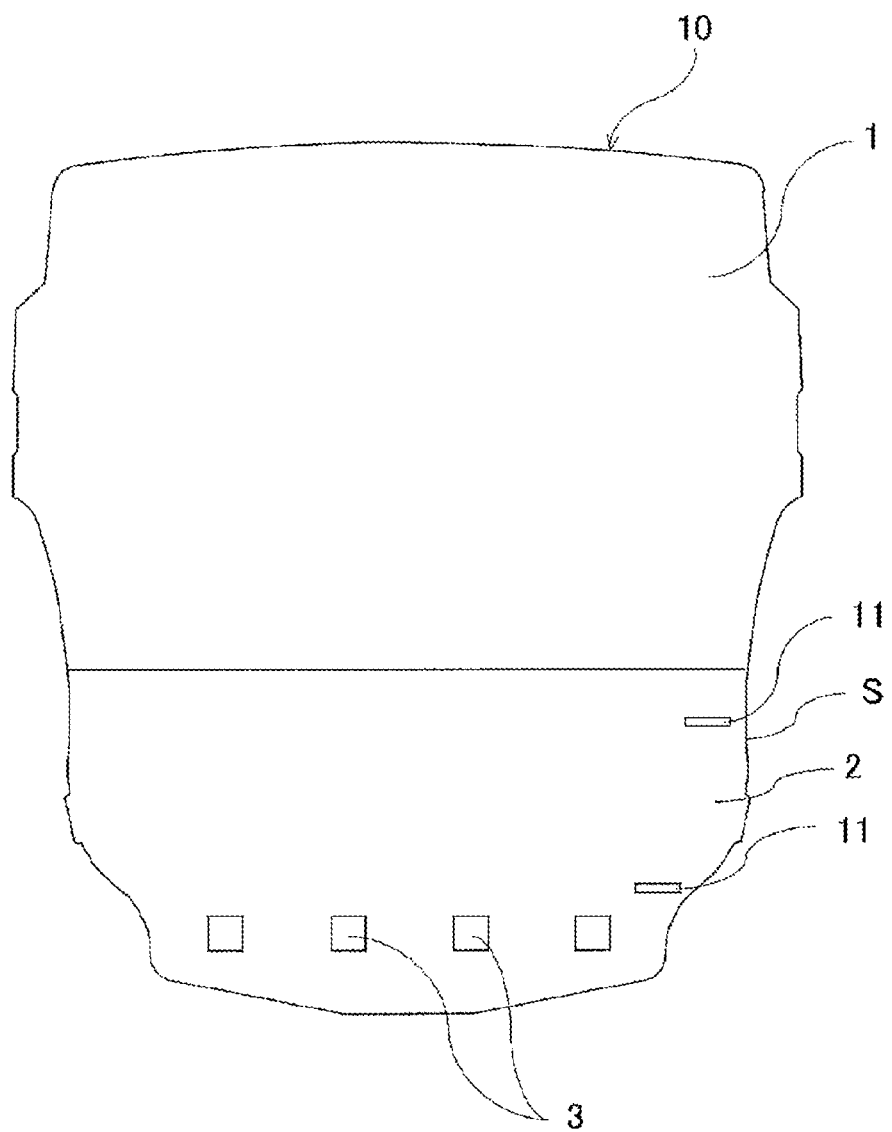
FIG. 4 is a meridian cross-sectional view illustrating a solid tire according to another embodiment of the present technology.

FIG. 4 illustrates a solid tire according to another embodiment of the present technology. Note that in FIG. 4, the same components as those in the embodiment illustrated in FIG. 1 are denoted by the same reference signs, and detailed descriptions thereof are omitted. In FIG. 4, the RFID tag 11 is embedded in the base rubber layer 2, and the RFID tag 11 is disposed near the side surface S of the base rubber layer 2, but its orientation is different from that of the embodiment of FIG. 1. That is, the sheet-shaped RFID tag 11 is embedded so as to be oriented along a tire axial direction, and is in a relationship of intersecting the side surface S of the base rubber layer 2. Such an orientation is also possible.

Figure 5:
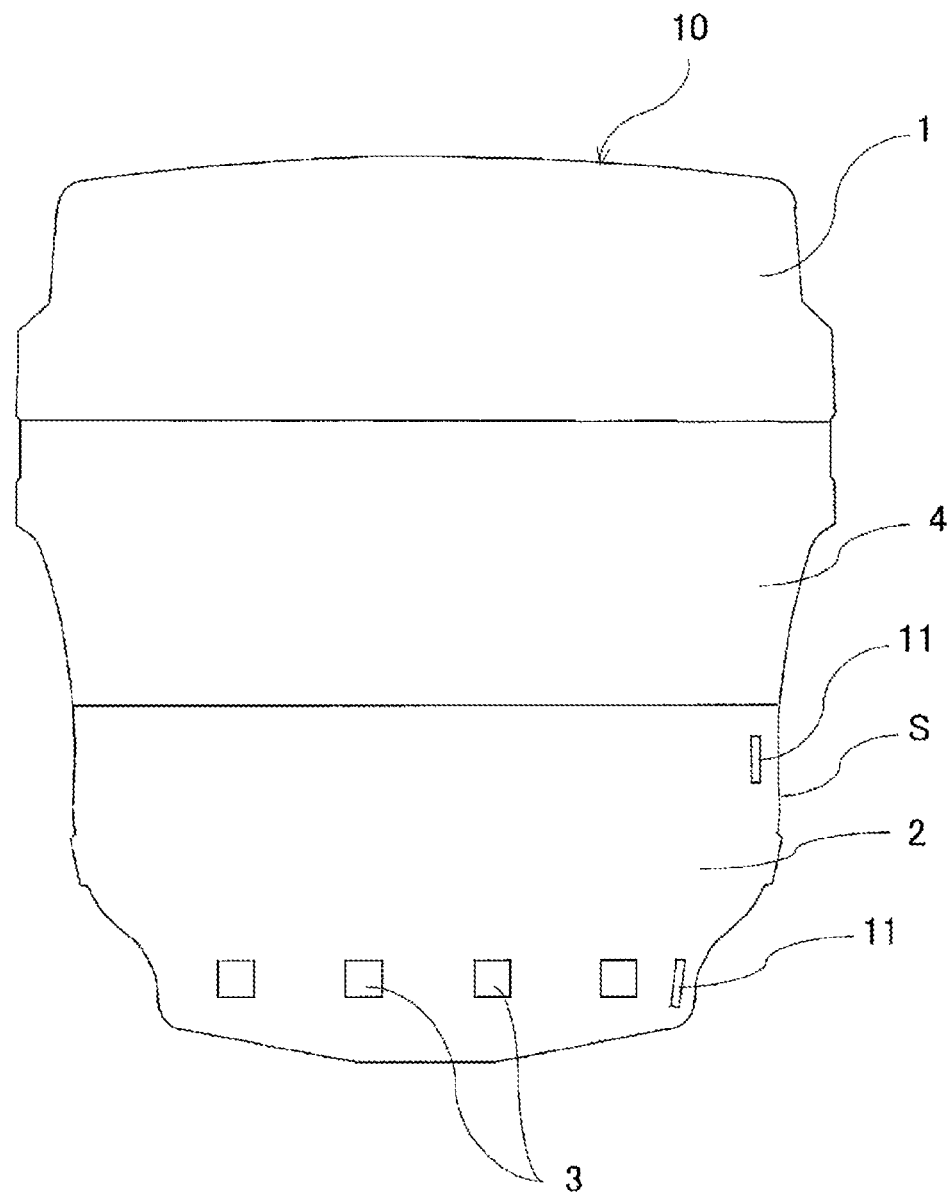
FIG. 5 is a meridian cross-sectional view illustrating a solid tire according to still another embodiment of the present technology.

FIG. 5 illustrates a solid tire according to still another embodiment of the present technology. Note that in FIG. 5, the same components as those in the embodiment illustrated in FIG. 1 are denoted by the same reference signs, and detailed descriptions thereof are omitted. In FIG. 5, an intermediate rubber layer 4 having a high cushioning property is inserted between the tread rubber layer 1 and the base rubber layer 2. By adding such an intermediate rubber layer 4, heat build-up of the tread rubber layer 1 can be suppressed, and wear resistance of the tread rubber layer 1 can be improved. As a rubber composition constituting the intermediate rubber layer 4, it is preferable to use a rubber composition that is softer than the tread rubber layer 1 and the base rubber layer 2 and has a low loss tangent tan δ. In addition, the intermediate rubber layer 4 may be composed of not only one layer but also two or more layers. In the solid tire 10 including the tread rubber layer 1 on the road contact surface side, the base rubber layer 2 on the rim side, and the intermediate rubber layer 4 located between the tread rubber layer 1 and the base rubber layer 2, the RFID tag 11 is embedded in the base rubber layer 2 whose JIS-A hardness is 80 or higher.

Figure 6:
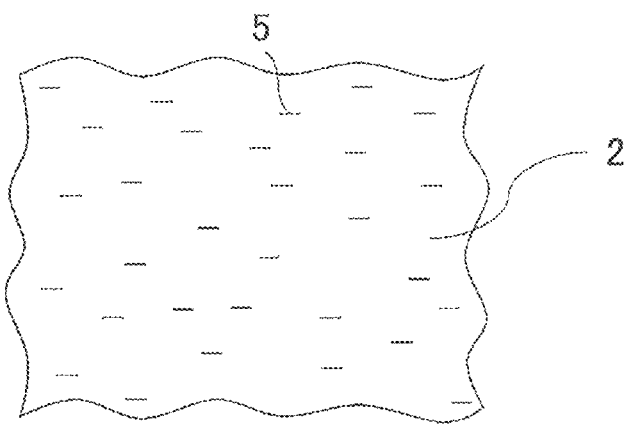
FIG. 6 is an enlarged cross-sectional view illustrating a part of a base rubber layer in which short fibers are blended.

In the above-described solid tire 10, as illustrated in FIG. 6, short fibers 5 are preferably blended in the rubber composition constituting the base rubber layer 2. As a result, deformation of the base rubber layer 2 can be suppressed, and the protection effect of the RFID tag 11 can be enhanced. In addition, by blending the short fibers 5 in the rubber composition constituting the base rubber layer 2, the rim slippage is suppressed, and from this standpoint as well, the protection effect of the RFID tag 11 can be enhanced. Note that when the rubber including the short fibers 5 blended therein is sheeted out, the short fibers 5 tend to be oriented in a sheet-out direction. For this reason, in the base rubber layer 2, the short fibers 5 are preferably oriented in the tire circumferential direction. By orienting the short fibers 5 of the base rubber layer 2 in the tire circumferential direction in this way, a hoop effect on the rim is effectively exhibited, and the effect of increasing the vertical rigidity and horizontal rigidity of the tire can be enhanced in addition to the effect of preventing the rim slip.

The short fibers 5, which are not limited to a particular fiber, can contain, for example, 1 phr to 10 phr of vinylon fibers having a fiber length of 2 mm to 10 mm and a fiber diameter of 5 μm to 50 μm. Such a vinylon fiber is suitable as a reinforcing material for the base rubber layer 2. Here, if the blending amount of the vinylon fibers is less than 1 phr, the modulus in the low-elongation region becomes small, the rigidity of the base rubber layer 2 decreases, and the base rubber layer 2 is easily bent, so that the protection effect of the RFID tag 11 decreases. On the other hand, if the blending amount of the vinylon fibers exceeds 10 phr, the modulus in the low-elongation region becomes too large, and mountability on rims is deteriorated. In addition, if the fiber length is less than 2 mm, the modulus in the low-elongation region becomes small, and thus the protection effect of the RFID tag 11 is reduced, whereas if the fiber length exceeds 10 mm, the modulus in the low-elongation region becomes excessively large, and thus mountability on rims is deteriorated. Further, if the fiber diameter is less than 5 μm, the dispersibility of the short fibers is reduced during rubber kneading, whereas if the fiber diameter exceeds 50 μm, the modulus in the low-elongation region is reduced due to a reduction in specific surface area of the vinylon fiber, and thus the protection effect of the RFID tag 11 is reduced. Furthermore, if the fiber diameter is too large, it becomes a foreign matter, which is not preferable.

Figure 7A:
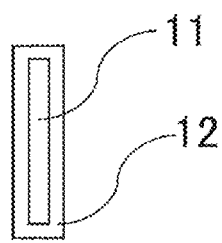
FIGS. 7A to 7E are cross-sectional views each illustrating a modified example of the RFID tag.

FIGS. 7A to 7E each illustrate a modified example of the RFID tag. In FIG. 7A, the RFID tag 11 is coated with an adhesive layer 12 made of an adhesive. As a result, the adhesion between the RFID tag 11 and the rubber can be enhanced, and a tire failure caused by peeling between the RFID tag 11 and the rubber can be prevented. For example, a vulcanizing adhesive represented by Chemlok (trade name) 6150 manufactured by LORD CORPORATION can be used.

Figure 7B:
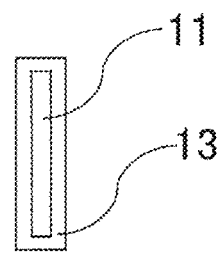

In FIG. 7B, the RFID tag 11 is coated with a resin layer 13 made of polyphenylene sulfide resin. The durability of the RFID tag 11 can be improved by coating the RFID tag 11 with the polyphenylene sulfide resin having heat resistance.

Figure 7C:
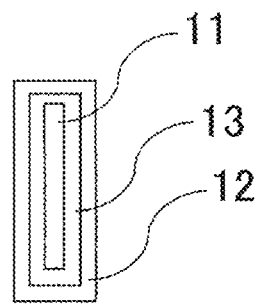

In FIG. 7C, the RFID tag 11 is coated with a resin layer 13 made of polyphenylene sulfide resin, and the resin layer 13 is further coated with an adhesive layer 12 made of an adhesive. In this case, the adhesion and heat resistance of the RFID tag 11 can be improved at the same time.

Figure 7D:
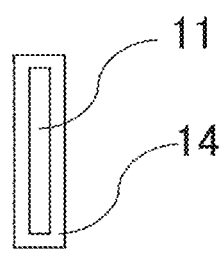

In FIG. 7D, the RFID tag 11 is coated with a ceramic layer 14 made of ceramic. The durability of the RFID tag 11 can be improved by coating the RFID tag 11 with ceramic having heat resistance and rigidity.

Figure 7E:
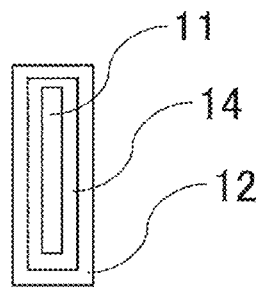

In FIG. 7E, the RFID tag 11 is coated with a ceramic layer 14 made of ceramic, and the ceramic layer 14 is further coated with an adhesive layer 12 made of an adhesive. In this case, the adhesion, heat resistance, and rigidity of the RFID tag 11 can be improved at the same time. Note that AP134 (primer), 6125 (cover) or the like of Chemlok (trade name) is preferably used as the adhesive on the ceramic layer side.

Figure 8A:
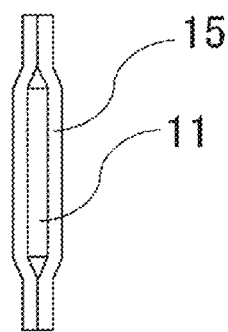
FIGS. 8A and 8B are cross-sectional views each illustrating another modified example of the RFID tag.
Figure 8B:
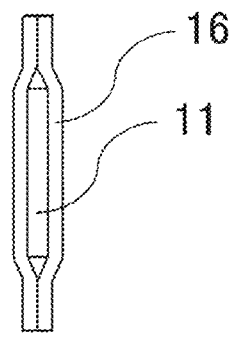

FIGS. 8A and 8B each illustrate a modified example of the RFID tag. In FIG. 8A, the RFID tag 11 is coated with a plurality of reinforcing fiber cords 15. The reinforcing fiber cord 15 is, for example, a cord fabric. By coating the RFID tag 11 with the reinforcing fiber cord 15, the durability of the RFID tag 11 can be improved. In addition, since the RFID tag 11 is coated with the reinforcing fiber cord 15, adhesion between the RFID tag 11 and the rubber can be enhanced. In particular, the RFID tag 11 is preferably coated with the reinforcing fiber cord 15 after applying a vulcanizing adhesive to the RFID tag 11.

In FIG. 8B, the RFID tag 11 is coated with a reinforcing fabric 16. By coating the RFID tag 11 with the reinforcing fabric 16, the durability of the RFID tag 11 can be improved. In addition, since the RFID tag 11 is coated with the reinforcing fabric 16, the adhesion between the RFID tag 11 and the rubber can be enhanced. In particular, the RFID tag 11 is preferably coated with the reinforcing fabric 16 after applying a vulcanizing adhesive to the RFID tag 11.

Figure 9:
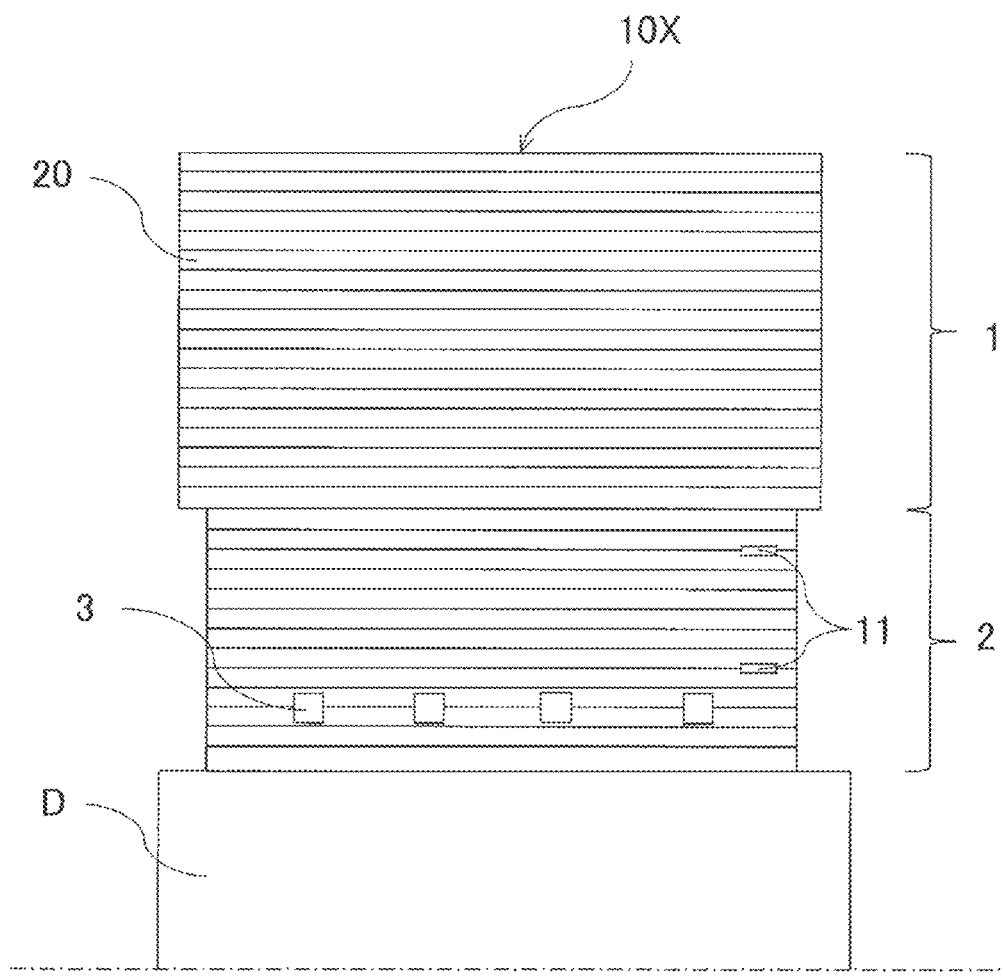
FIG. 9 is a meridian cross-sectional view illustrating a method for manufacturing a solid tire according to an embodiment of the present technology.

FIG. 9 illustrates a method (first method) for manufacturing a solid tire according to an embodiment of the present technology. In FIG. 9. D denotes a cylindrical forming drum that is expandable and contractible. When manufacturing the above-described solid tire 10, as illustrated in FIG. 9, a rubber sheet 20 is wound into multiple layers around the forming drum D to form an unvulcanized tire 10X. At this time, the RFID tag 11 is inserted between the layers of the rubber sheet 20 in the middle of the winding into multiple layers, whereby the RFID tag 11 can be embedded at a desired position of the solid tire 10. In FIG. 9, the RFID tag 11 is embedded in the base rubber layer 2. The unvulcanized tire 10X in which the RFID tag 11 is embedded as such is vulcanized in a mold having a cavity corresponding to the shape of the solid tire 10.

In the method for manufacturing the solid tire 10 described above, when winding the rubber sheet 20 into multiple layers, an outer diameter position of the forming drum D is used as a reference, a winding position of the rubber sheet 20 in the radial direction of the unvulcanized tire 10X is calculated in accordance with a winding length and a thickness of the rubber sheet 20, and the RFID tag 11 may be inserted in accordance with the winding position. That is, the RFID tag 11 may be inserted in the middle of the winding into multiple layers. Specifically, when a predetermined position is reached, the winding may be stopped once, the RFID tag 11 may be installed, and then the winding may be resumed. This operation may be performed multiple times when inserting a plurality of RFID tags 11. In addition, for example, in a tire having a two-layered structure with a 5.00-8 size, the base rubber sheet has a width of 120 mm and a thickness of 8 mm, and the winding is stopped once at the time when the base rubber sheet is wound into four layers, the RFID tag 11 is installed, and the base rubber sheet is further wound into two layers. Thereafter, the unvulcanized tire 10X with a total winding height of 110 mm of the tread rubber sheet is completed. When this is vulcanized in a predetermined mold to obtain a product, the RFID tag 11 is embedded at a position of about 200% of the rim flange height H. As a result, the RFID tag 11 can be embedded with high accuracy. In addition, when the winding position of the rubber sheet 20 in the radial direction of the unvulcanized tire 10X is calculated in accordance with the winding length and the thickness of the rubber sheet 20 and the RFID tag 11 is inserted in accordance with the winding position, the insertion operation of the RFID tag 11 can also be automated.

Figure 10:
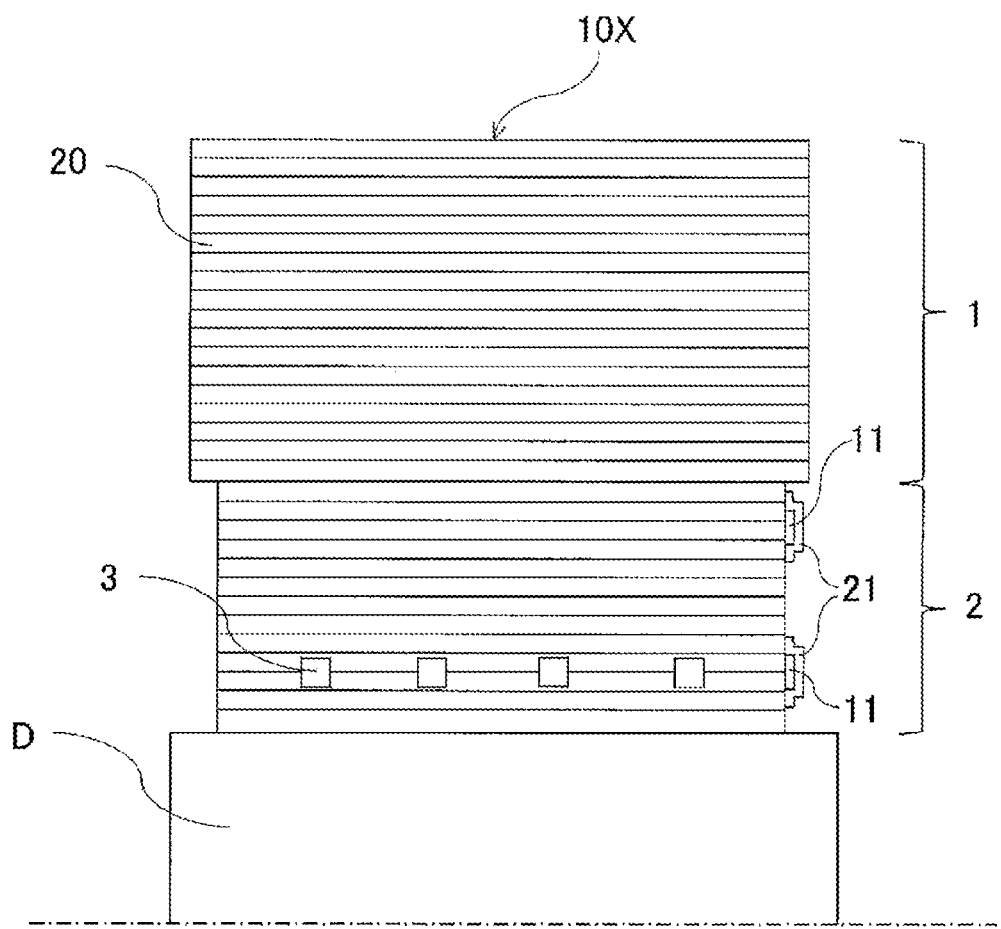
FIG. 10 is a meridian cross-sectional view illustrating a method for manufacturing a solid tire according to another embodiment of the present technology.

FIG. 10 illustrates a method (second method) for manufacturing a solid tire according to another embodiment of the present technology. In FIG. 10, D denotes a cylindrical forming drum that is expandable and contractible. When manufacturing the above-described solid tire 10, as illustrated in FIG. 10, a rubber sheet 20 is wound into multiple layers around the forming drum D to form an unvulcanized tire 10X, and then the RFID tag 11 is attached to a side surface of the unvulcanized tire 10X. In FIG. 10, the RFID tag 11 is attached to a portion corresponding to the base rubber layer 2. A coating layer 21 made of unvulcanized rubber having a thickness of 0.5 mm to 10 mm is overlaid and attached on the RFID tag 11, whereby the RFID tag 11 can be embedded at a desired position of the solid tire 10. The unvulcanized tire 10X in which the RFID tag 11 is embedded as such is vulcanized in a mold having a cavity corresponding to the shape of the solid tire 10.

In the present technology, the structure of the solid tire is not particularly limited as long as the solid tire includes the tread rubber layer on the road contact surface side and the base rubber layer on the rim side and the JIS-A hardness of the base rubber layer is 80 or higher. For example, it is also possible to adopt a structure in which an additional reinforcing member made of steel, organic fiber, or high-hardness rubber is embedded in the solid tire, or a structure in which an additional cushioning member made of low-hardness rubber is embedded in the solid tire.

Figure 11:
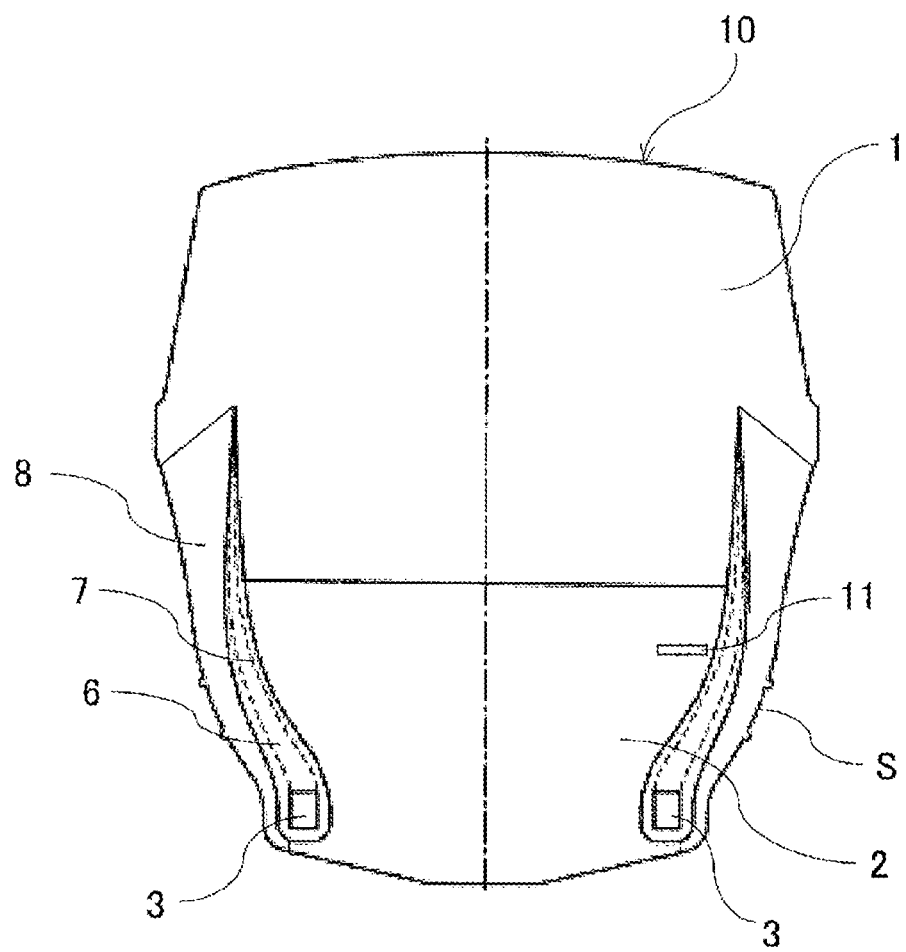
FIG. 11 is a meridian cross-sectional view illustrating a solid tire according to still another embodiment of the present technology.

FIG. 11 illustrates a solid tire according to still another embodiment of the present technology. Note that in FIG. 11, the same components as those in the embodiment illustrated in FIG. 1 are denoted by the same reference signs, and detailed descriptions thereof are omitted. In FIG. 11, a solid tire 10 includes a tread rubber layer 1 positioned on a road contact surface side, a base rubber layer 2 positioned on a rim side, a pair of bead cores 3 disposed on an outer side in a width direction of the base rubber layer 2, a side rubber layer 6 composed of rubber extending from each bead core 3 to an outer side in a tire radial direction, and a fiber-reinforced layer 7 embedded in the side rubber layer 6 so as to extend from each bead core 3 to an outer side in the tire radial direction. An assembly of the bead core 3, the side rubber layer 6 and the fiber-reinforced layer 7 is generally called a side wall. Further, a cover rubber layer 8 is disposed on an outer side, in the tire width direction, of the sidewall composed of the bead core 3, the side rubber layer 6 and the fiber-reinforced layer 7. Note that the side rubber layer 6 may be omitted. In this case, the fiber-reinforced layers 7 facing each other are directly bonded to each other. The presence or absence of the side rubber layer 6 and the characteristics of the rubber are determined by a size, performance, and the like of the tire. In the solid tire 10 configured as such, the RFID tag 11 can be embedded in the base rubber layer 2. Note that the bead core 3 can also be embedded in the base rubber layer 2, and in this case, the effect of suppressing the rim slip can be enhanced.

Figure 12:
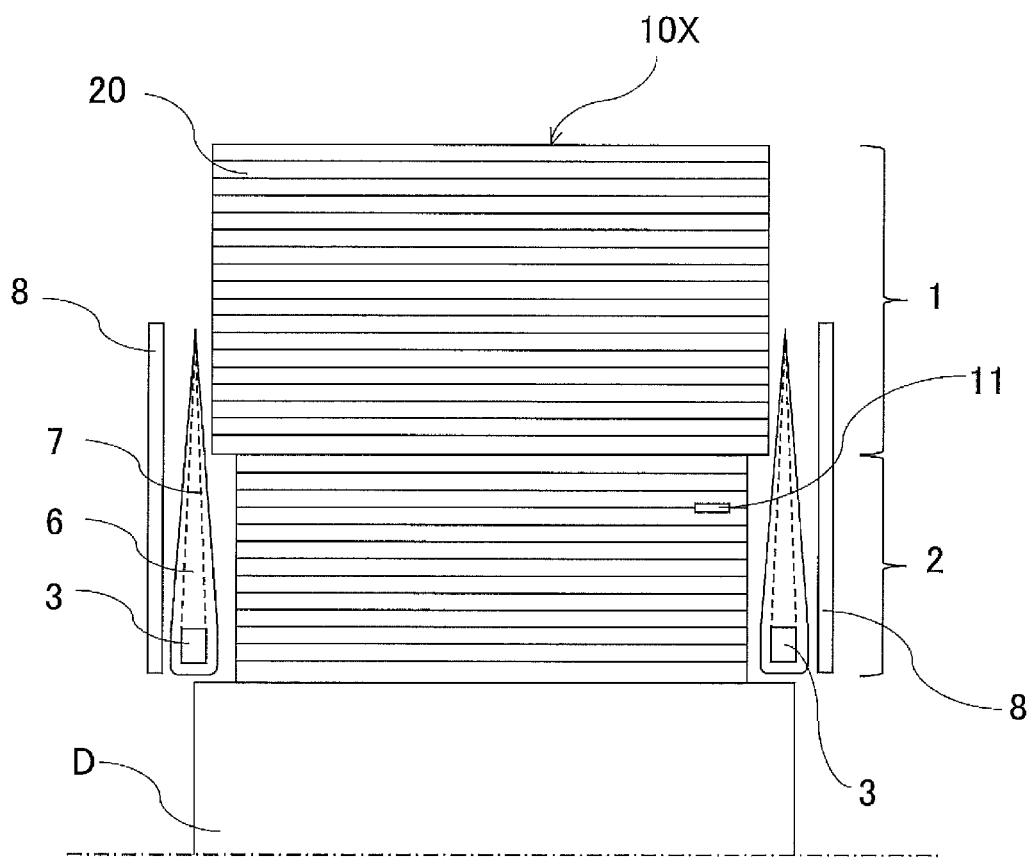
FIG. 12 is a meridian cross-sectional view illustrating a method for manufacturing the solid tire illustrated in FIG. 11.

FIG. 12 illustrates the method for manufacturing a solid tire illustrated in FIG. 11. In FIG. 12, D denotes a cylindrical forming drum that is expandable and contractible. When manufacturing the above-described solid tire 10, as illustrated in FIG. 12, a rubber sheet 20 is wound into multiple layers around the forming drum D. At this time, the RFID tag 11 is inserted between the layers of the rubber sheet 20 in the middle of the winding into multiple layers. Subsequently, the side walls each composed of the bead core 3, the side rubber layer 6, and the fiber-reinforced layer 7 are attached to a multilayer structure of the rubber sheet 20 from both sides in the tire width direction, and the cover rubber lavers 8 are further attached from the outside thereof to form an unvulcanized tire 10X. As a result, the RFID tag 11 can be embedded at a desired position of the solid tire 10. Note that the side rubber layer 6 may be omitted as described above.

Example

In pneumatic cushion tires for industrial vehicles having a tire size of 5.00-8 and including a tread rubber layer on a road contact surface side and a base rubber layer on a rim side, a plurality of types of test tires (Comparative Examples 1 to 7 and Examples 1 to 9) were manufactured in which an RFID tag was embedded in the base rubber layer and the JIS-A hardness of the base rubber layer was varied.

In Comparative Examples 1 to 7 and Examples 1 to 9, the blending of the base rubber layer, the JIS-A hardness of the tread rubber layer, and the JIS-A hardness of the base rubber layer are as shown in Table 1. Four bead cores are embedded in the base rubber layer of each test tire. As the RFID tag, a passive type RFID tag (fine ceramics tag type A manufactured by KYOCERA CORPORATION) having dimensions of 5 mm×15 mm×thickness 1.7 mm was used, the distance between the RFID tag and the side surface of the base rubber layer was set to 2.0 mm, and the RFID tag was embedded at (A) a position of 30% of the rim flange height. (B) a position of 100% of the rim flange height, and (C) a position of 200% of the rim flange height, respectively (refer to FIG. 3). In addition, SR7 manufactured by CAINWAY was used as a reader for reading the RFID tag.

Figure 13:
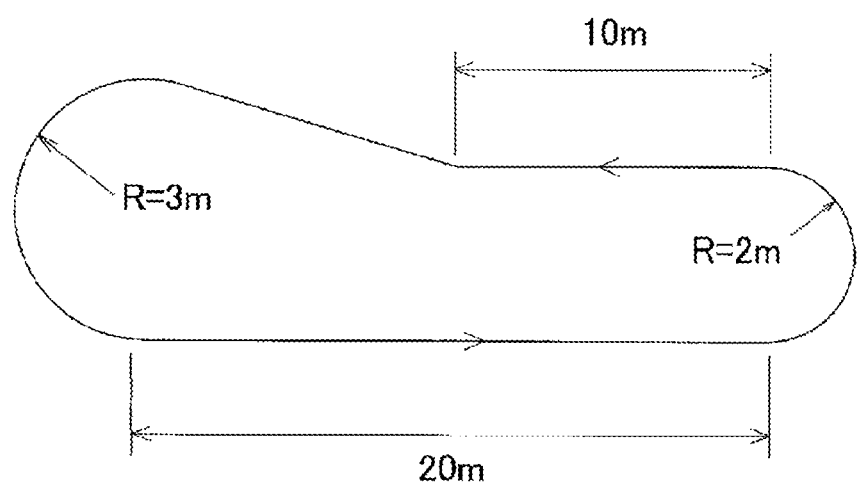
FIG. 13 is a plan view schematically illustrating a test course.

The test tires were subjected to the following actual vehicle test. That is, the test tire was mounted to a rim having a rim size of 8×3.00D, which was then mounted on each of the left and right rear wheels of a forklift, and the forklift having a load weight of 500 kg was driven at a driving speed of 8.8 km/h for 100 hours on a test course having a dry flat road surface paved with concrete. The test course is a circuit illustrated in FIG. 13, and a circumferential distance thereof is 56 m. Note that the test was carried out intermittently with a driving time of 5 hours per day. After completion of the test, a width of the rim slippage formed on the side surface of the base rubber layer was measured, and a ratio (%) of the rim slippage width to the rim flange height was obtained. In addition, an operation confirmation test was performed on the RFID tags (A, B, and C) embedded in the base rubber layer. A case where a normal operation was confirmed is indicated by "○", and a case where no operation was confirmed is indicated by "x". The results are shown in Table 1.

TABLE 1-1

| Blending of base rubber layer | Comparative Example 1 | Comparative Example 2 | Comparative Example 3 | Comparative Example 4 |
|---|---|---|---|---|
| Natural rubber | 55 | 55 | 55 | 55 |
| SBR1500 | 45 | 45 | 45 | 45 |
| Oil-modified phenol resin | 0 | 0 | 0 | 1 |
| Carbon black (N330) | 72 | 76 | 80 | 80 |
| Stearic acid | 2 | 2 | 2 | 2 |
| Zinc oxide | 5 | 5 | 5 | 5 |
| Anti-aging agent (6PPD) | 2 | 2 | 2 | 2 |
| Wax | 1 | 1 | 1 | 1 |
| Aroma oil | 13 | 13 | 13 | 13 |
| Sulfur | 2.5 | 2.5 | 2.5 | 2.5 |
| Vulcanization accelerator (CBS) | 1 | 1 | 1 | 1 |
| Hexamethylenetetramine | 0 | 0 | 0 | 0. |
| JIS-A hardness of tread rubber layer | 63 | 63 | 63 | 63 |
| JIS-A hardness of base rubber layer | 68 | 70 | 72 | 74 |
| Rim slippage width (%) | ±15 | ±15 | ±13 | ±11 |
| Operation of RFID tag after driving test   A | x | x | x | ○ |
| B | x | x | x | x |
| C | x | x | x | x |

TABLE 1-2

| Blending of base rubber layer | Comparative Example 5 | Comparative Example 6 | Comparative Example 7 |
|---|---|---|---|
| Natural rubber | 55 | 55 | 55 |
| SBR1500 | 45 | 45 | 45 |
| Oil-modified phenol resin | 2 | 3 | 3.5 |
| Carbon black (N330) | 80 | 80 | 80 |
| Stearic acid | 2 | 2 | 2 |
| Zinc oxide | 5 | 5 | 5 |
| Anti-aging agent (6PPD) | 2 | 2 | 2 |
| Wax | 1 | 1 | 1 |
| Aroma oil | 13 | 13 | 13 |
| Sulfur | 2.5 | 2.5 | 2.5 |
| Vulcanization accelerator (CBS) | 1 | 1 | 1 |
| Hexamethylenetetramine | 0.2 | 0.3 | 0.35 |
| JIS-A hardness of tread rubber layer | 63 | 63 | 63 |
| JIS-A hardness of base rubber layer | 76 | 78 | 79 |
| Rim slippage width (%) | ±9 | ±6 | ±4 |
| Operation of RFID tag after driving test   A | ○ | ○ | ○ |
| B | x | x | x |
| C | x | ○ | ○ |

TABLE 1-3

| Blending of base rubber layer | Example 1 | Example 2 | Example 3 | Example 4 | Example 5 |
|---|---|---|---|---|---|
| Natural rubber | 55 | 55 | 55 | 55 | 55 |
| SBR1500 | 45 | 45 | 45 | 45 | 45 |
| Oil-modified phenol resin | 4 | 4.5 | 5 | 6 | 7 |
| Carbon black (N330) | 80 | 80 | 80 | 80 | 80 |
| Stearic acid | 2 | 2 | 2 | 2 | 2 |
| Zinc oxide | 5 | 5 | 5 | 5 | 5 |
| Anti-aging agent (6PPD) | 2 | 2 | 2 | 2 | 2 |
| Wax | 1 | 1 | 1 | 1 | 1 |
| Aroma oil | 13 | 13 | 13 | 13 | 13 |
| Sulfur | 2.5 | 2.5 | 2.5 | 2.5 | 2.5 |
| Vulcanization accelerator (CBS) | 1 | 1 | 1 | 1 | 1 |
| Hexamethylenetetramine | 0.4 | 0.45 | 0.5 | 0.6 | 0.7 |
| JIS-A hardness of tread rubber layer | 63 | 63 | 63 | 63 | 63 |
| JIS-A hardness of base rubber layer | 80 | 81 | 82 | 84 | 86 |
| Rim slippage width (%) | ±2 | ±1 | 0 | 0 | 0 |
| Operation of RFID tag after driving test   A | ○ | ○ | ○ | ○ | ○ |
| B | ○ | ○ | ○ | ○ | ○ |
| C | ○ | ○ | ○ | ○ | ○ |

TABLE 1-4

| Blending of base rubber layer | Example 6 | Example 7 | Example 8 | Example 9 |
|---|---|---|---|---|
| Natural rubber | 55 | 55 | 55 | 55 |
| SBR1500 | 45 | 45 | 45 | 45 |
| Oil-modified phenol resin | 8 | 10 | 15 | 17 |
| Carbon black (N330) | 80 | 80 | 80 | 80 |
| Stearic acid | 2 | 2 | 2 | 2 |
| Zinc oxide | 5 | 5 | 5 | 5 |
| Anti-aging agent (6PPD) | 2 | 2 | 2 | 2 |
| Wax | 1 | 1 | 1 | 1 |
| Aroma oil | 13 | 13 | 13 | 13 |
| Sulfur | 2.5 | 2.5 | 2.5 | 2.5 |
| Vulcanization accelerator (CBS) | 1 | 1 | 1 | 1 |
| Hexamethylenetetramine | 0.8 | 1.0 | 1.5 | 1.7 |
| JIS-A hardness of tread rubber layer | 63 | 63 | 63 | 63 |
| JIS-A hardness of base rubber layer | 88 | 90 | 96 | 99 |
| Rim slippage width (%) | 0 | 0 | 0 | 0 |
| Operation of RFID tag after driving test   A | ○ | ○ | ○ | ○ |
| B | ○ | ○ | ○ | ○ |
| C | ○ | ○ | ○ | ○ |

As can be seen from Table 1, in the tires of Examples 1 to 9, the rim slippage width was small, and all the RFID tags operated normally. On the other hand, in the tires of Comparative Examples 1 to 7, since the JIS-A hardness of the base rubber layer was less than 80, the rim slippage width was large, and at least a part of the RFID tags did not operate.

Next, in pneumatic cushion tires for industrial vehicles having a tire size of 5.00-8 and including a tread rubber layer on a road contact surface side and a base rubber layer on a rim side, a plurality of types of test tires (Examples 11 to 18) were manufactured in which an RFID tag was embedded in the base rubber layer and an amount of short fibers blended into a rubber composition constituting the base rubber layer was varied. As the short fiber, a vinylon fiber (vinylon fiber 1) having a fiber length of 4 mm and a fiber diameter of 12 μm or a vinylon fiber (vinylon fiber 2) having a fiber length of 8 mm and a fiber diameter of 24 μm was used.

In Examples 11 to 18, the blending of the base rubber layer, the JIS-A hardness of the tread rubber layer, the JIS-A hardness of the base rubber layer, and the modulus at 10% elongation of the base rubber layer are as shown in Table 2. Four bead cores are embedded in the base rubber layer of each test tire. As the RFID tag, a passive type RFID tag (fine ceramics tag type A manufactured by KYOCERA CORPORATION) having dimensions of 5 mm×15 mm×thickness 1.7 mm was used, the distance between the RFID tag and the side surface of the base rubber layer was set to 2.0 mm, and the RFID tag was embedded at (A) a position of 30% of the rim flange height, (B) a position of 100% of the rim flange height, and (C) a position of 200% of the rim flange height, respectively (refer to FIG. 3). In addition, SR7 manufactured by CAINWAY was used as a reader for reading the RFID tag.

For the test tires, in the same manner as described above, after performing the actual vehicle test, the ratio (%) of the rim slippage width was obtained, and the operation confirmation test was performed for the RFID tags (A, B, and C). However, the driving time was 1.2 times that of the test of Table 1. The results are shown in Table 2.

TABLE 2-1

| Blending of base rubber layer | Example 11 | Example 12 | Example 13 | Example 14 |
|---|---|---|---|---|
| Natural rubber | 55 | 55 | 55 | 55 |
| SBR1500 | 45 | 45 | 45 | 45 |
| Oil-modified phenol resin | 4 | 4 | 4 | 4 |
| Carbon black (N330) | 80 | 80 | 80 | 80 |
| Stearic acid | 2 | 2 | 2 | 2 |
| Zinc oxide | 5 | 5 | 5 | 5 |
| Anti-aging agent (6PPD) | 2 | 2 | 2 | 2 |
| Wax | 1 | 1 | 1 | 1 |
| Aroma oil | 13 | 13 | 13 | 13 |
| Vinylon fiber 1 | 1 | 5 | 10 | 12 |
| Vinylon fiber 2 | — | — | — | — |
| Sulfur | 2.5 | 2.5 | 2.5 | 2.5 |
| Vulcanization accelerator (CBS) | 1 | 1 | 1 | 1 |
| Hexamethylenetetramine | 0.4 | 0.4 | 0.4 | 0.4 |
| JIS-A hardness of tread rubber layer | 63 | 63 | 63 | 63 |
| JIS-A hardness of base rubber layer | 80 | 80 | 81 | 81 |
| Modulus (MPa) at 10% elongation of base rubber layer | 2.3 | 3 | 4.8 | 5.5 |
| Rim slippage width (%) | ±2 | 0 | 0 | 0 |
| Operation of RFID tag after driving test  A | ○ | ○ | ○ | ○ |
| B | ○ | ○ | ○ | ○ |
| C | ○ | ○ | ○ | ○ |

TABLE 2-2

| Blending of base rubber layer | Example 15 | Example 16 | Example 17 | Example 18 |
|---|---|---|---|---|
| Natural rubber | 55 | 55 | 55 | 55 |
| SBR1500 | 45 | 45 | 45 | 45 |
| Oil-modified phenol resin | 4 | 4 | 4 | 4 |
| Carbon black (N330) | 80 | 80 | 80 | 80 |
| Stearic acid | 2 | 2 | 2 | 2 |
| Zinc oxide | 5 | 5 | 5 | 5 |
| Anti-aging agent (6PPD) | 2 | 2 | 2 | 2 |
| Wax | 1 | 1 | 1 | 1 |
| Aroma oil | 13 | 13 | 13 | 13 |
| Vinylon fiber 1 | — | — | — | — |
| Vinylon fiber 2 | 1 | 5 | 10 | 12 |
| Sulfur | 2.5 | 2.5 | 2.5 | 2.5 |
| Vulcanization accelerator (CBS) | 1 | 1 | 1 | 1 |
| Hexamethylenetetramine | 0.4 | 0.4 | 0.4 | 0.4 |
| JIS-A hardness of tread rubber layer | 63 | 63 | 63 | 63 |
| JIS-A hardness of base rubber layer | 80 | 80 | 81 | 81 |
| Modulus (MPa) at 10% elongation of base rubber layer | 2.1 | 2.7 | 4.5 | 5.3 |
| Rim slippage width (%) | 0 | 0 | 0 | 0 |
| Operation of RFID tag after driving test  A | ○ | ○ | ○ | ○ |
| B | ○ | ○ | ○ | ○ |
| C | ○ | ○ | ○ | ○ |

As can be seen from Table 2, in the tires of Examples 11 to 18, the rim slippage width was small, and all the RFID tags operated normally.

Next, Example 4 and Examples 19 and 20 in which the distance between the RFID tag and the side surface of the base rubber layer in Example 4 was changed to 6.0 mm or 10.0 mm were manufactured, and the response accuracy of the RFID tag was evaluated by the following test method. That is, "○" indicates that the RFID tag can be read from a position 20 cm away from the surface of the base rubber layer in the tire axial direction, "Δ" indicates that the RFID tag can be read from a position 10 cm away from the surface of the base rubber layer in the tire axial direction, and "x" indicates that the RFID tag cannot be read from a position 10 cm away from the surface of the base rubber layer in the tire axial direction. The results are shown in Table 3.

TABLE 3

| Blending of base rubber layer | Example 4 | Example 19 | Example 20 |
|---|---|---|---|
| Natural rubber | 55 | 55 | 55 |
| SBR1500 | 45 | 45 | 45 |
| Oil-modified phenol resin | 6 | 6 | 6 |
| Carbon black (N330) | 80 | 80 | 80 |
| Stearic acid | 2 | 2 | 2 |
| Zinc oxide | 5 | 5 | 5 |
| Anti-aging agent (6PPD) | 2 | 2 | 2 |
| Wax | 1 | 1 | 1 |
| Aroma oil | 13 | 13 | 13 |
| Sulfur | 2.5 | 2.5 | 2.5 |
| Vulcanization accelerator (CBS) | 1 | 1 | 1 |
| Hexamethylenetetramine | 0.6 | 0.6 | 0.6 |
| JIS-A hardness of tread rubber layer | 63 | 63 | 63 |
| JIS-A hardness of base rubber layer | 84 | 84 | 84 |
| Distance (mm) between RFID tag and side surface | 2.0 | 6.0 | 10.0 |
| Response accuracy | ○ | ○ | Δ |

As can be seen from Table 3, by setting the distance between the RFID tag and the side surface of the base rubber layer to 10.0 mm or less, good responsiveness could be secured.

The invention claimed is:

1. A solid tire, comprising:
    a tread rubber layer on a road contact surface side of the solid tire, the road contact surface side being configured to contact a road; and
    a base rubber layer on a rim side of the solid tire, the rim side being configured to contact a rim when the solid tire is mounted on a rim;
    the base rubber layer having JIS-A hardness of 80 or higher, and
    an RFID tag being embedded in the base rubber layer; wherein
    a distance between the RFID tag and a side surface of the base rubber layer ranges from 0.5 mm to 10.0 mm,
    the RFID tag is disposed at a position deviating from a rim slippage region defined within a range of −15% to +15% of a rim flange height with an apex of a rim flange as a center, and
    the RFID tag is disposed radially inward of the rim slippage region.

2. The solid tire according to claim 1, wherein the RFID tag is embedded substantially parallel to a side surface of the base rubber layer.

3. The solid tire according to claim 1, wherein the RFID tag is disposed within a distance of 0.5 mm to 10.0 mm from a side surface of the base rubber layer that is on an outer side of a vehicle when mounted on the vehicle.

4. The solid tire according to claim 1, wherein short fibers are blended in a rubber composition constituting the base rubber layer.

5. The solid tire according to claim 4, wherein the short fibers contain 1 phr to 10 phr of vinylon fibers having a fiber length of 2 mm to 10 mm and a fiber diameter of 5 μm to 50 μm.

6. The solid tire according to claim 1, wherein the RFID tag is coated with an adhesive.

7. The solid tire according to claim 1, wherein the RFID tag is coated with polyphenylene sulfide resin.

8. The solid tire according to claim 1, wherein the RFID tag is coated with ceramic.

9. The solid tire according to claim 1, wherein the RFID tag is coated with a plurality of reinforcing fiber cords.

10. The solid tire according to claim 1, wherein the RFID tag is coated with a reinforcing fabric.

11. A method for manufacturing the solid tire described in claim 1, the method comprising:
   when forming an unvulcanized tire by winding a rubber sheet into multiple layers,
   inserting the RFID tag between layers of the rubber sheet in a middle of the winding of the multiple layers; and
   vulcanizing the unvulcanized tire comprising the RFID tag in a mold to obtain the solid tire.

12. The method for manufacturing the solid tire according to claim 11, comprising:
   when winding the rubber sheet into the multiple layers, calculating a winding position of the rubber sheet in a radial direction of the unvulcanized tire in accordance with a winding length and a thickness of the rubber sheet; and
   inserting the RFID tag in accordance with the winding position.

13. A method for manufacturing the solid tire described in claim 1, the method comprising:
   forming an unvulcanized tire by winding a rubber sheet into multiple layers;
   then attaching the RFID tag to a side surface of the unvulcanized tire;
   further overlaying and attaching a coating layer made of unvulcanized rubber having a thickness of 0.5 mm to 10 mm on the RFID tag; and
   then vulcanizing the unvulcanized tire comprising the RFID tag in a mold to obtain the solid tire.

* * * * *